United States Patent
Ren et al.

(10) Patent No.: US 10,102,670 B2
(45) Date of Patent: Oct. 16, 2018

(54) SYSTEM AND METHOD FOR PROCEDURALLY GENERATED BUILDING GRAPHICS WITHIN A STREET NETWORK OF A THREE-DIMENSIONAL VIRTUAL ENVIRONMENT

(71) Applicant: Robert Bosch GmbH, Stuttgart (DE)

(72) Inventors: Liu Ren, Cupertino, CA (US); Lincan Zou, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/240,600

(22) Filed: Aug. 18, 2016

(65) Prior Publication Data
US 2018/0053343 A1   Feb. 22, 2018

(51) Int. Cl.
| | | |
|---|---|---|
| G06T 17/05 | (2011.01) | |
| G06T 15/04 | (2011.01) | |
| G06T 11/00 | (2006.01) | |
| G06T 17/00 | (2006.01) | |

(52) U.S. Cl.
CPC ............ *G06T 17/05* (2013.01); *G06T 11/001* (2013.01); *G06T 15/04* (2013.01); *G06T 17/00* (2013.01); *G06T 2210/12* (2013.01); *G06T 2210/61* (2013.01)

(58) Field of Classification Search
CPC ... G06F 3/0482; G06F 3/04842; G06Q 30/02; H04W 4/02
USPC ........................................................ 345/418
See application file for complete search history.

(56) References Cited

U.S. PATENT DOCUMENTS

| | | | | |
|---|---|---|---|---|
| 8,130,245 | B2* | 3/2012 | Ham | G06F 17/30902 340/995.15 |
| 8,224,355 | B2* | 7/2012 | Beydler | G01S 5/0027 455/456.5 |
| 9,400,591 | B2* | 7/2016 | Sheha | G06Q 30/02 |
| 2005/0171754 | A1 | 8/2005 | Santodomingo et al. | |
| 2016/0253842 | A1* | 9/2016 | Shapira | G02B 27/017 345/633 |

OTHER PUBLICATIONS

Sample et al, Tile-Based Geospatial Information Systems, Springer Science+Business Media, pp. 1-241, 2011.*

(Continued)

*Primary Examiner* — Zhengxi Liu
(74) *Attorney, Agent, or Firm* — Maginot Moore & Beck LLP (57) ABSTRACT

A system and method of procedural generation of graphics corresponding to a plurality of buildings in a three-dimensional virtual environment includes identifying a region in the three-dimensional virtual environment that is enclosed by a plurality of streets within the three-dimensional virtual environment, generating a two-dimensional arrangement of a plurality of tiles within the region, identifying one building segment graphic in the subset of building segment graphics corresponding to each tile based on an array of pseudo-random index values stored in the memory for each tile in the plurality of tiles, and generating a graphical depiction of the three-dimensional virtual environment including a graphical depiction of the plurality of buildings in the region based on the two-dimensional arrangement of the plurality of tiles and the building segment graphic identified for each tile in the plurality of tiles.

12 Claims, 8 Drawing Sheets

(56) References Cited

OTHER PUBLICATIONS

Shang, Xiaohong. "A Study on Efficient Vector Mapping With Vector Tiles Based on Cloud Server Architecture." PhD diss., University of Calgary, 2015.*

Vanegas, Carlos A., et al. "Procedural generation of parcels in urban modeling." Computer graphics forum. vol. 31. No. 2pt3. Blackwell Publishing Ltd, 2012.*

Silva, Pedro Brandaõ, et al. "Procedural content graphs for urban modeling." International Journal of Computer Games Technology 2015 (2015): 10.*

Talton, Jerry O., et al. "Metropolis procedural modeling." ACM Transactions on Graphics (TOG) 30.2 (2011): 11.*

Parish, Yoav IH, and Pascal Müller. "Procedural modeling of cities." Proceedings of the 28th annual conference on Computer graphics and interactive techniques. ACM, 2001.*

Official Blog, "The never-ending quest for the perfect map", Jun. 6, 2012 (4 pages). Available: https://googleblog.blogspot.com/2012/06/never-ending-quest-for-perfect-map.html 1/.

Yang, Yong-Liang et al., "Urban Pattern: Layout Design by Hierarchical Domain Splitting," ACM Transactions on Graphics, Proceedings of ACM Siggraph Asia, 2013 (12 pages).

Mueller, Pascal et al., "Procedural Modeling of Buildings," ACM Transactions on Graphics, Proceedings of Siggraph, 2006 (10 pages).

International Search Report corresponding to International Patent Application No. PCT/EP2017/069889 (6 pages).

Lefebvre, Sylvain et al., "Pattern Based Procedural Textures", Proceedings of Symposium on Interactive 3D Graphics, ACM, Apr. 27, 2003 (10 pages).

Varley, Peter A.C. et al., "A new algorithm for finding faces in wireframes", Computer-Aided Design vol. 42, No. 4, Elsevier Publishers, Apr. 1, 2010 (12 pages).

Lipp, M. et al., "Interactive Modeling of City Layouts using Layers of Procedural Content", Europgraphics 2011, vol. 30, No. 2, Apr. 1, 2011 (10 pages).

Aune, Gisle et al., "Noxed—A NOX Engine World Editor", Norwegian University of Science and Technology, May 18, 2016 (151 pages).

Kelly, George et al., "Citygen: An Interactive System for Procedural City Generation", Proceedings of Fifth International Conference on Game Design and Technology, Jan. 1, 2007 (9 pages).

* cited by examiner

SYSTEM AND METHOD FOR PROCEDURALLY GENERATED BUILDING GRAPHICS WITHIN A STREET NETWORK OF A THREE-DIMENSIONAL VIRTUAL ENVIRONMENT

FIELD

This disclosure relates generally to the field of computer graphics and, more specifically, to systems and methods for procedural generation of graphics representing buildings in three-dimensional computer graphics.

BACKGROUND

Many modern software applications display three-dimensional representations of virtual environments as part of a user interface. Three-dimensional (3D) graphics are used in a wide range of applications including video games, simulations, virtual and augmented reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

To display three-dimensional graphics, the computing system requires geometry information for structures and other items in the three-dimensional virtual environment along with various other pieces of data including textures and lighting information to perform the processing to produce a graphical depiction of the virtual environment. In some instances, a large number of comparatively small graphical models, such as buildings, are displayed within the virtual environment. Storing individual graphical models for a large number of buildings is often impractical, so some prior art systems employ various techniques for procedural generation to display groups of buildings using a comparatively small set of geometric data that can be stored in memory in a practical manner. Procedurally generated graphics refer to graphics, including 3D graphics, which a computing device generates using a comparatively small set of stored graphics data including models and textures and one or more computational algorithms to construct complex graphical scenes from the stored graphics data instead of storing precise geometric models for the entire virtual environment. For example, generating a cluster of buildings from a set of a few individual building models stored in the memory is one application of procedurally generated graphics.

While procedurally generated graphics reduce the requirements for complex pre-generated graphical models for a virtual environment, the prior art procedural graphics generation techniques also require substantial computing resources which are often unavailable in many embedded and lower-power computing devices such as in-vehicle navigation systems and mobile electronic devices. In particular, prior art graphical generation techniques for a large number of buildings that are arranged between blocks of streets in an urban or suburban three-dimensional environment may not be practical for use with lower power devices. For example, online mapping services such as Google Maps and Apple Maps require mobile device users to download predetermined models for all three-dimensional building models. In a dense environment with a large number of buildings, the requirement to download all building models requires the mobile electronic device to consume large amounts of network bandwidth and battery power. Consequently, improved techniques for procedural generation of graphics for large numbers of buildings in a computationally efficient manner would be beneficial.

SUMMARY

In one embodiment, a method for generating graphics corresponding to a plurality of buildings in a three-dimensional virtual environment has been developed. The method includes identifying, with a processor, a region in the three-dimensional virtual environment that is enclosed by a plurality of streets within the three-dimensional virtual environment, generating, with the processor, a two-dimensional arrangement of a plurality of tiles within the region, each tile corresponding to a subset of building segment graphics in a plurality of building segment graphics stored in a memory, identifying, with the processor, one building segment graphic in the subset of building segment graphics for each tile in the plurality of tiles based on an array of pseudo-random index values stored in the memory, each index value corresponding to one building segment graphic in the subset of building segment graphics, and generating, with the processor and a display device, a graphical depiction of the three-dimensional virtual environment including a graphical depiction of the plurality of buildings in the region based on the two-dimensional arrangement of the plurality of tiles and the one building segment graphic identified for each tile in the plurality of tiles.

In another embodiment, a graphics display system that generates graphical representations of a three-dimensional virtual environment. The system includes a display device, a memory configured to store data corresponding to a three-dimensional virtual environment including a plurality of streets and a plurality of building segment graphics for buildings in the three-dimensional virtual environment, and a processor operatively connected to the memory and the display device. The processor is configured to identify a region in the three-dimensional virtual environment that is enclosed by the plurality of streets within the three-dimensional virtual environment, generate a two-dimensional arrangement of a plurality of tiles within the region, each tile corresponding to a subset of building segment graphics in the plurality of building segment graphics, identify one building segment graphic in the subset of building segment graphics for each tile in the plurality of tiles based on an array of pseudo-random index values stored in the memory, each index value corresponding to one building segment graphic in the subset of building segment graphics, and generate a graphical depiction of the three-dimensional virtual environment with the display device, the graphical depiction including a plurality of buildings in the region based on the two-dimensional arrangement of the plurality of tiles and the one building segment graphic identified for each tile in the plurality of tiles.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the terms "three-dimensional (3D) virtual environment" or more simply "virtual environment" refer to a set of geometric, texture, and other graphical data that are stored in a memory of a computer system to enable the computer system to generate a graphical depiction of a space with three visually perceivable dimensions, which are often projected onto a two-dimensional video display device or can be displayed using a three-dimensional viewing device. While not a requirement, many three-dimensional virtual environments represent geographical regions on Earth including graphical representations of land, water, the sky, lighting, and other environmental effects that provide a visual representation of the environment on Earth. The virtual environment data include topographic information such as the elevation and inclines of land features, locations of water, as we as other geographic features. Artificial structures such as buildings, streets, bridges, and the like can be depicted within the three-dimensional virtual environments. Additionally, the three-dimensional virtual environment often includes regions that correspond to man-made structures including streets and buildings. As described in further detail below, the computer systems taught herein generate graphical depictions of the three-dimensional virtual environment that include procedurally generated building graphics in regions of the 3D virtual environment that are surrounded by streets in a street network.

As used herein, the term "building" refers to a three-dimensional structure that is located in the 3D virtual environment to provide a graphical depiction of a man made structure within the 3D virtual environment. The term "building segment" refers to a graphical structure that can form an entire building by itself or be placed adjacent to other building segments to form one or multiple larger contiguous building structures. Different building segments are generated to be aligned with different neighboring building segments to enable generation of graphics for a large building from multiple building segments or to represent groups of adjacent buildings that form a block in the 3D virtual environment. As described in more detail below, a memory stores multiple sets of interchangeable building segment graphics to enable the system to produce a wide variety of procedurally generated buildings using different combinations of building segments. In most instances, the building structures extend from a ground surface in the 3D virtual environment. The systems and methods described herein enable procedural generation of building structures within a three-dimensional virtual environment without requiring that specific model data for each building within the 3D virtual environment.

Figure 1:
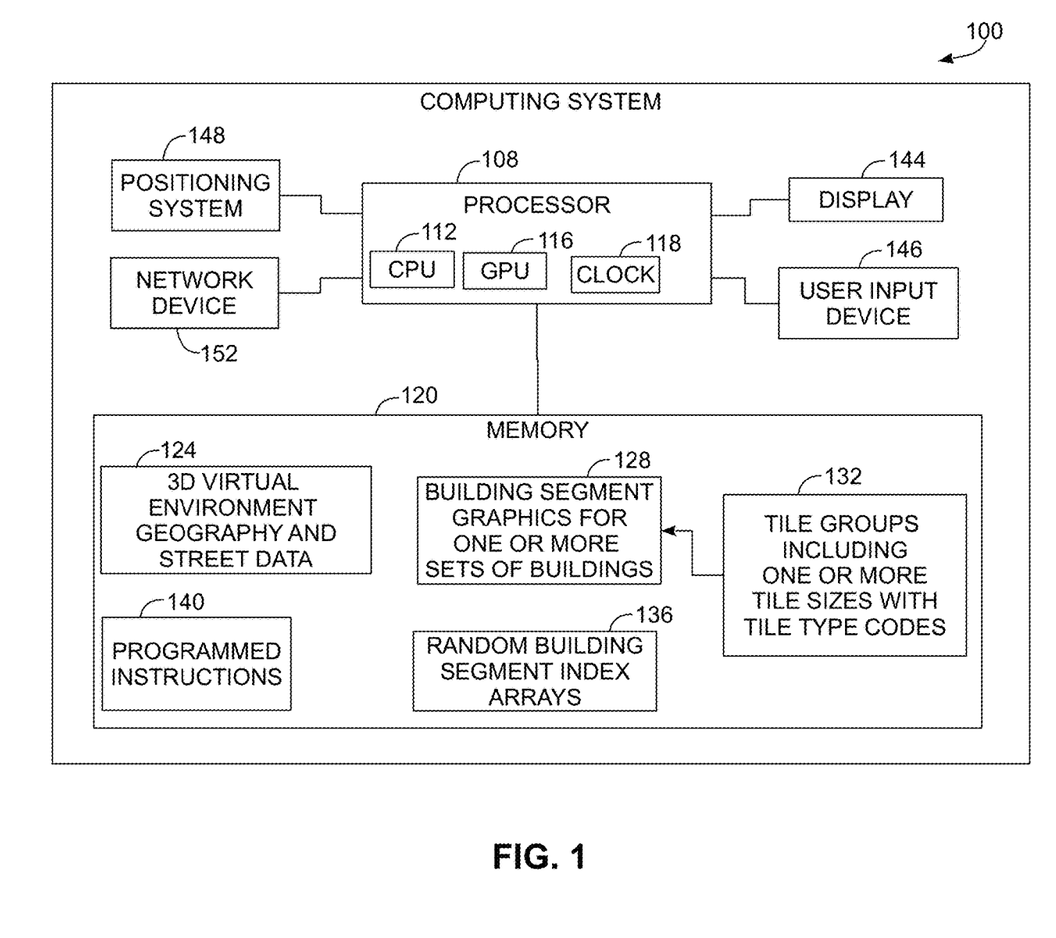
FIG. 1 is a schematic diagram of a computing device that is configured to generate three-dimensional (3D) graphics including procedurally generated buildings in a 3D virtual environment.

FIG. 1 depicts a graphics display system 100 that generates graphical representations of a three-dimensional virtual environment. Non-limiting examples of the system 100 include in-vehicle navigation systems, mobile electronic devices such as smartphones, tablets, or wearable computing devices, and other embedded computing systems that generate graphical depictions of three-dimensional virtual environments. FIG. 1 depicts a computing system 100 that generates a graphical display of a 3D virtual environment including a representation of ground, such as the surface of the Earth, with ground lighting and wall lighting textures applied to the regions surrounding the structures and to the polygons that depict walls of the structures. The computing system 100 includes a processor 108, memory 120, display 144, user input devices 146, optional positioning system 148, and optional network device 152. Hardware embodiments of the computing system 100 include, but are not limited to, personal computer (PC) hardware, embedded system hardware including embedded computing hardware for use in a motor vehicle, and mobile electronic devices including smartphone and tablet computing devices.

In the computing system 100, the processor 108 includes one or more integrated circuits that implement the functionality of a central processing unit (CPU) 112, a graphics processing unit (GPU) 116, and a clock 118. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPs instruction set families. The GPU includes hardware and software for display of both 2D and 3D graphics. In one embodiment, processor 108 executes software drivers and includes hardware functionality in the GPU 116 to generate 3D graphics using the OpenGL, OpenGL ES, Vulkan, Metal, or Direct3D graphics application programming interfaces (APIs). For example, the GPU 116 includes one or more hardware execution units that implement vertex shaders and fragment shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. The processor 108 executes the mapping and navigation program and generates 2D and 3D graphical output corresponding to maps and map features through the display device 144. The processor is configured with software and hardware functionality by storing programmed instructions in one or more memory devices operatively connected to the processor and by operatively connecting the hardware functionality to the processor and/or other electronic, electromechanical, or mechanical components to provide data from sensors or data sources to enable the processor to implement the processes and system embodiments discussed below.

In the processor 108, the clock 118 is a timing device that maintains a time value using a predetermined format (e.g. seconds since the epoch) that the system 100 can use for various purposes including identifying the time of year in the physical environment that is external to the system 100 using a calendar software program. In some embodiments the system 100 periodically sets the clock 118 based on data received via the network device 152 from external time servers using, for example, the network time protocol (NTP) or from timing data received from external transmitters via the positioning system 148.

The memory 120 includes both non-volatile memory and volatile memory. The non-volatile memory includes solid-state memories, such as NAND flash memory, magnetic and optical storage media, or any other suitable data storage device that retains data when the in-vehicle information system 100 is deactivated or loses electrical power. The volatile memory includes static and dynamic random access memory (RAM) that stores software and data, including graphics data and map feature data, during operation of the in-vehicle information system 100. In addition to the programmed instructions 140, the memory 120 includes 3D virtual environment data 124, graphics models for one or more sets of building segments 128, data corresponding to one or more tile groups 132 that include type codes for each tile and a mapping to the building segment graphics 128, and pseudo-random building segment index arrays 136. The 3D virtual environment data 124 includes a model of a virtual environment include ground terrain information, streets that extend through regions of the terrain, and structures that are not procedurally generated, such as unique landmarks within the 3D virtual environment. The 3D virtual environment data include vertices with three-dimensional coordinates that define a series of interconnected polygons, such as triangles, that form the shape of various features within the 3D virtual environment.

In the memory 120, the building segment graphics data 128 includes three-dimensional models for various types of procedurally generated buildings in the 3D virtual environment. Some of the building segments include complete models for buildings that can arranged next to each other in a block and other building segments form portions of larger structures that are formed from smaller structural elements. In one embodiment, each set of building segment graphics is organized logically a two-dimensional array in the memory 120 with the geometric model for each building segment corresponding to a type code for one of the tiles 132 on one axis and an arbitrarily assigned index number that corresponds to one of the index numbers in the random building segment index arrays 136. Thus, for any given tile with a given type code, the building segment graphics data 128 include at least one set of graphics data with a plurality of suitable building segments, which provides a greater variation in the arrangements of buildings in the 3D virtual environment since different regions correspond to different arrays of pseudo-random index numbers that select different building segment graphics for the different regions. The building segment data 128 optionally contains multiple sets of building segment graphics to accommodate multiple tile sizes in the tile group data 132 or to have different sets of model graphics for different building architectural styles. Additionally, the building segment graphics 132 optionally include textures, lighting effects, and other stored graphical shader programs or graphical effects that enable the system 100 to apply different graphical effects to a single set of geometric building segment models to generate graphics that depict different lighting conditions (e.g. day and night) or graphics that depict the buildings during different seasonal and weather conditions.

In the memory 120, the tile group data 132 includes a plurality of "tiles" that each represent a two-dimensional region that corresponds to a portion of the building segments in the building segment data 128. As described below, each tile is assigned a four bit type code that describes the layout of adjacent neighboring tiles and identifies a subset of the building segment graphics data 128 that is suitable for use with each tile. For example, a type code indicating that the left and bottom side of a tile borders other tiles and that the top and right side of the tile borders the street corresponds to sets of building graphics in the building segment data 128 that have the appropriate visual appearance to represent buildings at a northeast corner of a block bordered by two streets where the block includes additional buildings to the south and west of the corner. In a two-dimensional arrangement of tiles, each tile includes a four bit type code that specifies up to sixteen different sets of adjacent tiles (or no adjacent tiles). The tile data 132 optionally include multiple tile groups, where each tile group corresponds to tiles of a particular size, and different tile groups include larger or smaller tile sizes that correspond to graphical models for larger and smaller building segments. The type code for each tile is associated with a plurality of different building graphic segment models 128 to provide visual variation in the 3D virtual environment. The random tile index array 136 includes multiple numeric arrays of indices into the building segment graphics for each tile code. The random tile index data are generated in a random or pseudo-random manner and stored in the memory 120 to control the selection of building segment graphics in a deterministic manner. The random tile index array data 136 enables the system 100 to generate graphics with procedurally generated buildings that provide an appearance of randomness in the 3D virtual environment but that can be regenerated by the system 100 in a deterministic manner to enable the system 100 to generate the same set of buildings in a consistent manner at different times of operation.

The computing system 100 includes an optional network device 152 that is configured to send and receive data from external computing systems through a data network (not shown). Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the processor 108 retrieves virtual environment data 124, structure model polygon data 128, and texture data 132 from an external network for storage in the memory 120. In some embodiments, the memory 120 caches the graphics data and the processor 108 stores additional graphical data that is received through the network device 152 to update the contents of the memory 120.

The computing system 100 includes an optional positioning system device 148 that is operatively connected to the processor 108. Examples of positioning systems include global positioning system (GPS) receivers, radio triangulation receivers that identify a location of the computing system 100 with respect to fixed wireless transmitters, and inertial navigation systems. During operation, the processor 108 executes mapping and navigation software applications that retrieve location information from the positioning system 148 to identify a geographic location of the computing system 100 and to adjust the display of the virtual environment to correspond to the location of the computing system 100. In navigation applications, the processor 108 identifies the location and movement of the computing system 100 for the generation of routes to selected destinations and display of the routes in the 3D virtual environment.

In the computing system 100, the display 144 is either an integrated display device, such as an LCD or other display device, which is integrated with a housing of the computing system 100, or the display 144 is an external display device that is operatively connected to the computing system 100 through a wired or wireless interface to receive output signals from the processor 108 to generate a display of the 3D virtual environment. In an embodiment where the computing system 100 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle. In the computing system 100, the input device 146 is, for example, a touchscreen input device that is integrated with the display 144, a voice input device, or another suitable device that receives input data from an operator of the system 100.

Figure 2:
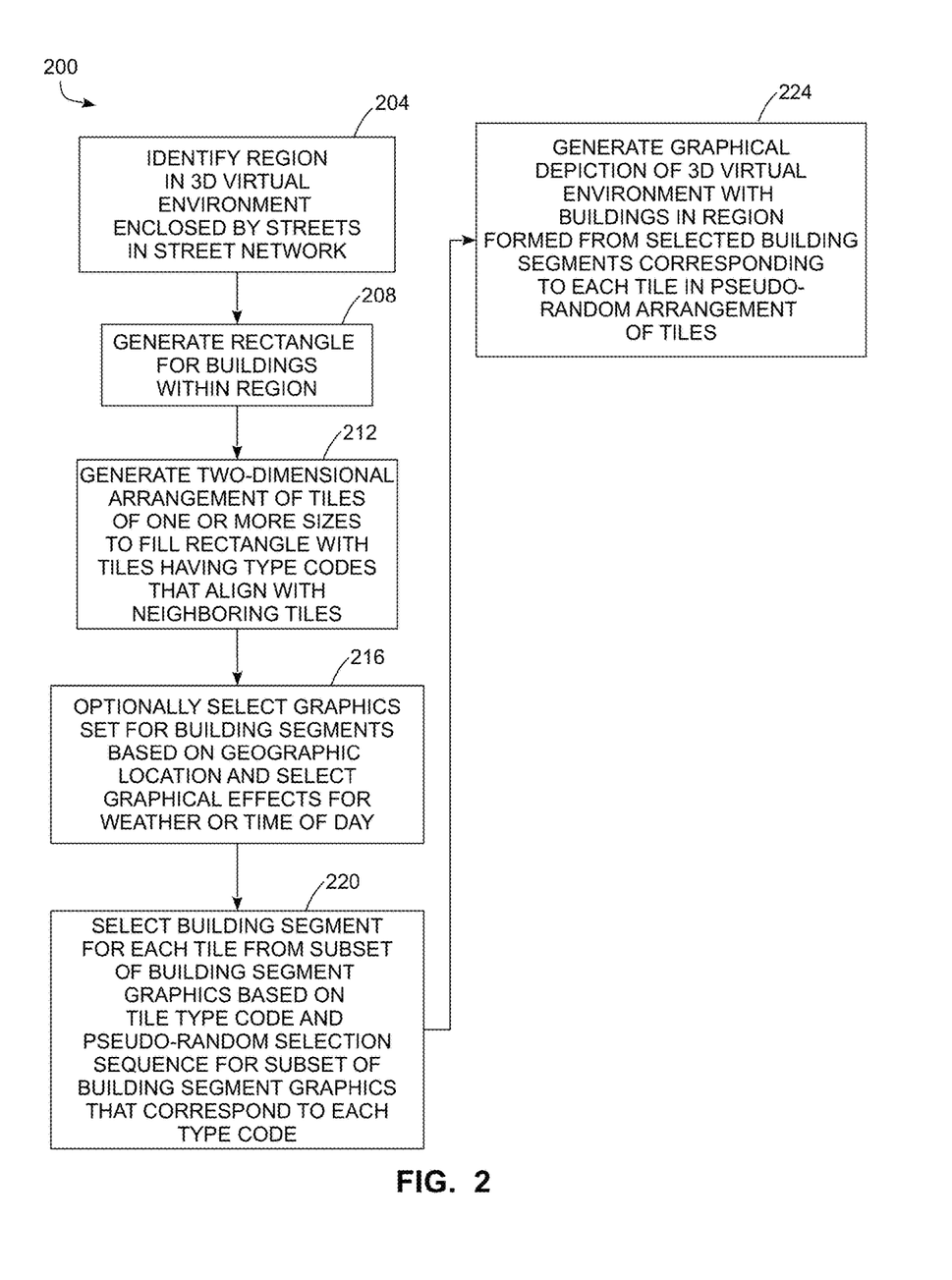
FIG. 2 is a block diagram of a process for procedural generation and display of buildings within a street network in a 3D virtual environment.

FIG. 2 depicts a process 200 for the procedural generation of building graphics within regions a 3D virtual environment that are enclosed by streets within the 3D virtual environment. In the discussion below, a reference to the process 200 performing a function or action refers to an operation of a processor to execute stored program instructions to perform the function or action in association with other components in a graphics display system. The process 200 is described in conjunction with the system 100 of FIG. 1 and the depictions of FIG. 4-FIG. 8 for illustrative purposes.

Figure 3:
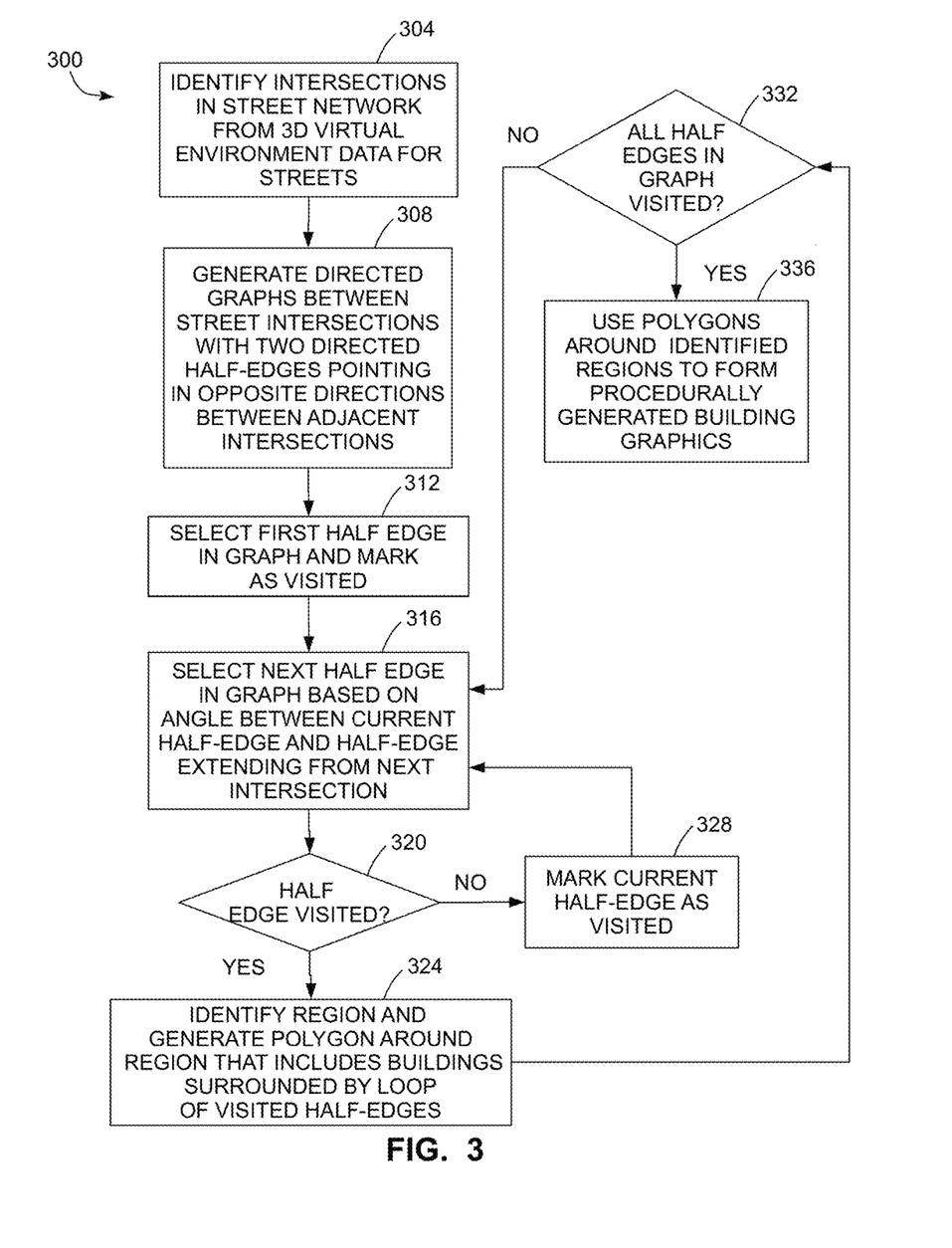
FIG. 3 is a block diagram of a process for identifying regions that are enclosed by streets in the 3D virtual environment during the process of FIG. 2.
Figure 4:
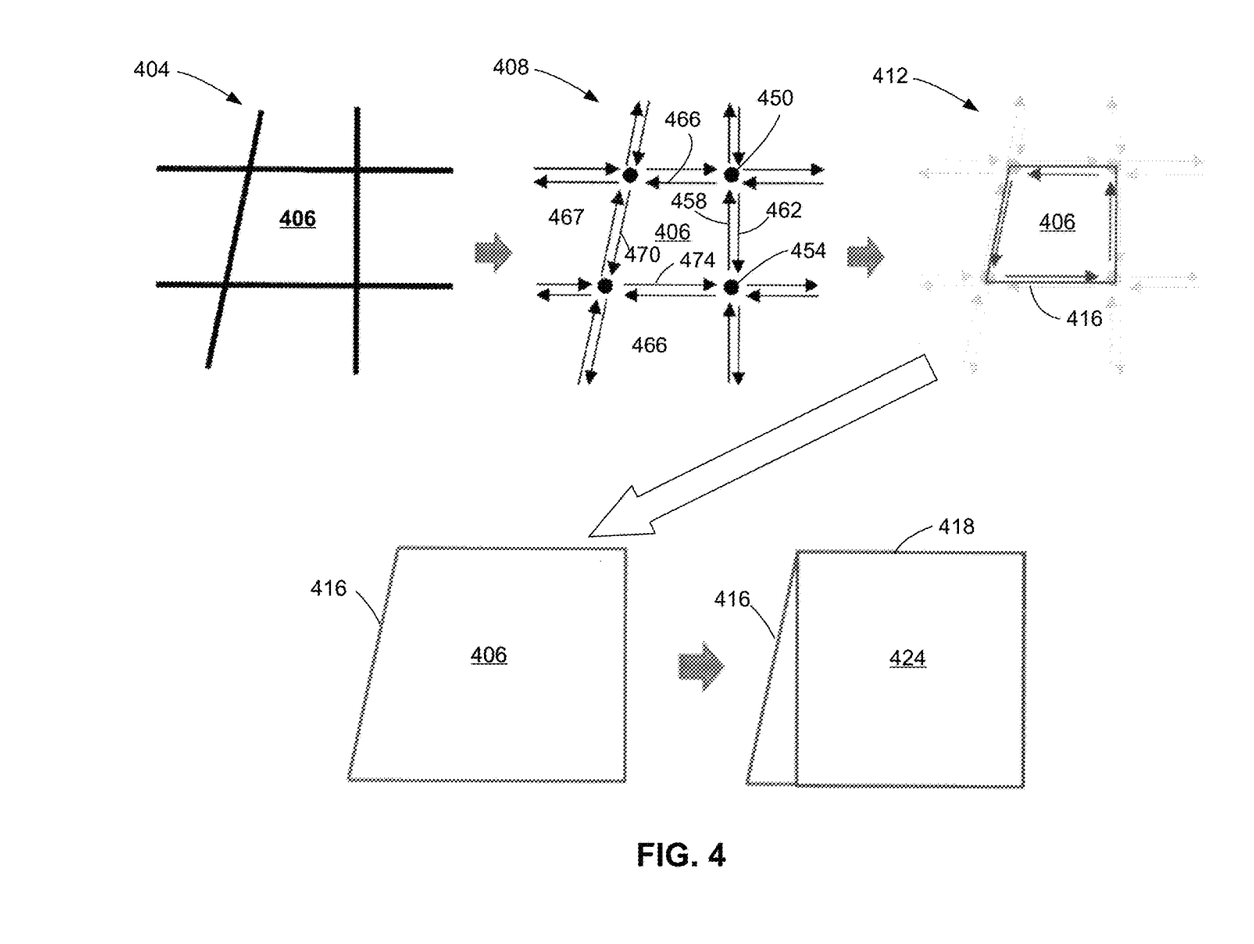
FIG. 4 is a diagram depicting a connected graph for a street network that the system of FIG. 1 uses to generate polygons around identified regions that include procedurally generated buildings in a 3D virtual environment.

Process 200 begins as the processor 108 identifies a region in the three-dimensional virtual environment that is enclosed by a plurality of streets within the three-dimensional virtual environment (block 204). As described above, the 3D virtual environment data 124 includes a network of streets within the 3D virtual environment that enclose geographic areas, such as grids of streets in urban settings that enclose blocks with buildings. As is described in more detail below in FIG. 3, the processor 108 identifies two-dimensional regions that are enclosed by the street network. In one embodiment, the processor 108 generates a polygon corresponding to each region that is enclosed by streets. FIG. 4 provides an illustrative example of a section of the street network 404 including a plurality of streets that surround a region 406. As described in FIG. 3, the processor 108 traverses multiple sets of directed graph edges to identify the region 406 within the street network and generate a bounding polygon 416 that corresponds to the streets that form boundaries to enclose the region 406. In the processes described herein, the bounding polygon surrounds the region in two dimensions without considering height. During the generation of the building graphics, the processor 108 positions the buildings on the surface of the land or other surfaces within the region 406 based on the height coordinates that are present in the three-dimensional virtual environment data 124.

The process 200 continues as the processor 108 generates a "maximum rectangle" corresponding to a rectangle that covers all or as much of the enclosed region as can be covered with a single rectangular polygon (block 208). In one embodiment, the processor 108 generates a rectangle starting from each vertex of the polygon that encloses the region, such as each vertex of the polygon 416 in FIG. 4, and expands the rectangle until the rectangle reaches the sides of the polygon 416. The processor 108 uses the rectangle with the largest area as the maximum rectangle that occupies a portion of the polygon. FIG. 4 depicts a maximum sized rectangle 418 with an inner region 424 within the trapezoidal polygon 416. Some regions have rectangular shapes and the rectangle with the maximum size matches the full size of the region. For some regions with more complex shapes and sufficient size to accommodate building models, the processor 108 subdivides the region into multiple rectangles and performs the remaining operations of the process 200 in each rectangle within the region.

Figure 5:
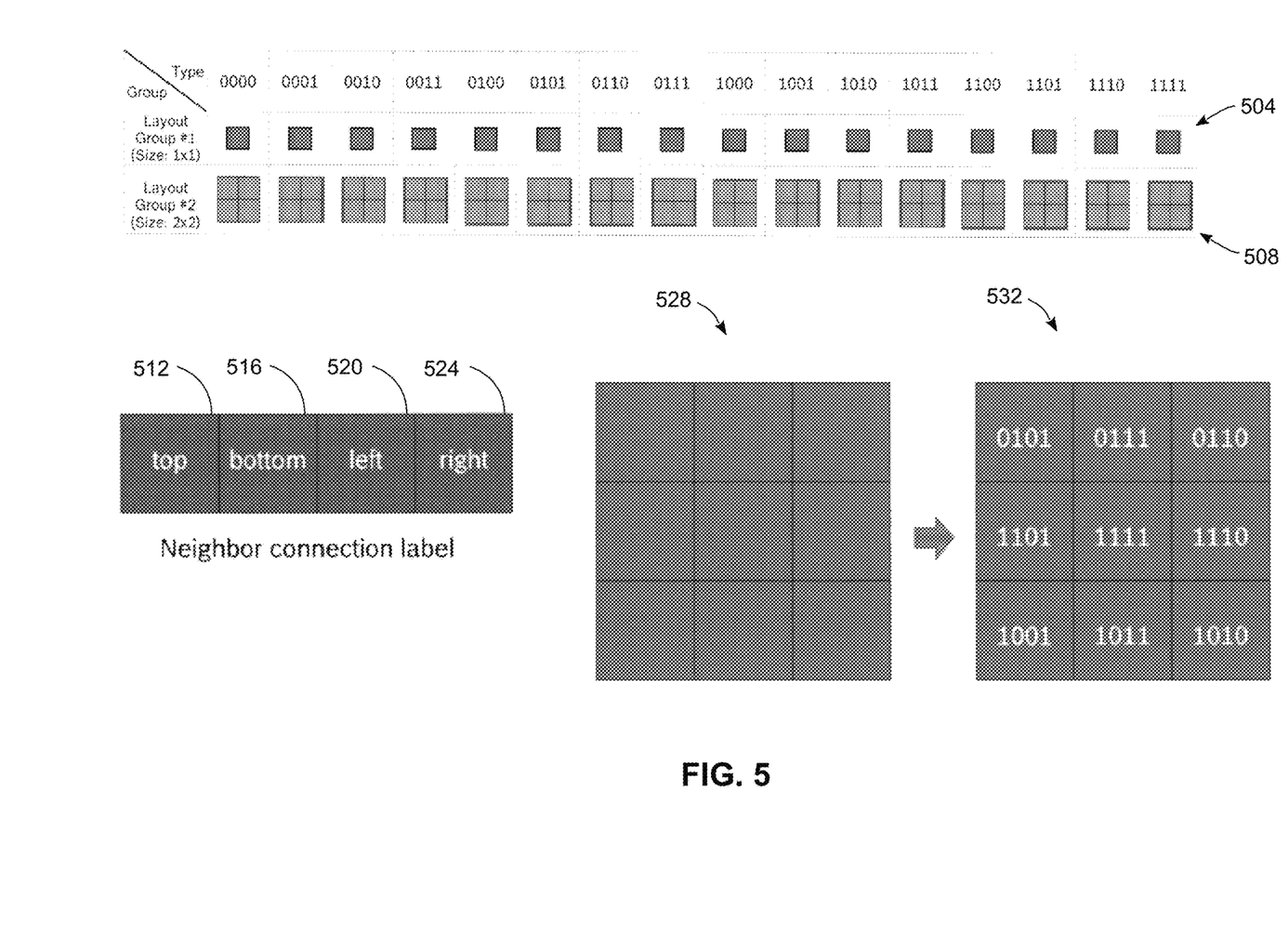
FIG. 5 is an illustrative diagram of tile groups for two different tile sizes with an example of type codes that correspond to a two-dimensional arrangement of the tiles.

Process 200 continues as the processor 108 generates a two-dimensional arrangement of tiles corresponding to the predetermined building segment graphics to fill the rectangular portion of the region (block 212). In the embodiment of the system 100, the processor 108 fills the rectangular region with a selection two different tile sizes, although alternative embodiments use a single tile size or more than two tiles sizes. In the system 100, each size of tile is also referred to as a "tile group". FIG. 5 depicts two different tile groups 504 and 508. The tile group 504 depicts a smaller tile size and the group 508 depicts a larger tile size. The system 100 uses the smaller tiles 504 to fill smaller regions between streets and to fill margins of larger areas that cannot include additional tiles of the larger size. The larger tiles 508 enable the system 100 to fill in larger regions in an efficient manner during the process 200, and the smaller tiles enable increased coverage of the procedurally generated buildings within different regions of the 3D virtual environment.

As depicted in FIG. 5, each tile in the tile groups 504 and 508 is assigned a predetermined type code, such as a four-bit code depicted in FIG. 5 to generate sixteen tiles in each tile group. During the process 200, the processor 108 assigns one of the type codes to each tile based on sides of the tile that are adjacent to other tiles, if any, in the two-dimensional arrangement of the tiles. The type code assigned to each tile indicates the types of adjacent neighboring tiles that may be arranged next to the tile. For example, in FIG. 5 the four bit type codes correspond to the top (512), bottom (516), left (520), and right (524) sides of each tile, with a binary value of "1" indicating that a corresponding side of the tile neighbors another tile within the two-dimensional arrangement of tiles. The building segment graphics for the different tile codes are generated with a structure that accommodates the neighboring tiles based on the type codes. A "0" value in the type code for a particular side indicates that the building segments associated with the tile have graphics for an exterior face of a building on a particular side. As depicted in FIG. 5, a two-dimensional arrangement of nine tiles 528 is formed with the type codes depicted in the two-dimensional arrangement 532.

Each type code references a set of multiple building segment graphics stored in the memory 120 that are suitable for being placed next to the corresponding adjacent tiles in the arrangement. For example, the central tile with code "1111" corresponds to a set of building segment graphics that have connectors or other graphical elements to accommodate neighboring building segments on all four sides of the tile, such as a central hall or other central segment of a building that is connected to wings and other structures. On the exterior of the tile arrangement 532, the type codes refer to sets of building segment graphics that have selected sides to connect to adjacent tiles for sides with type "1" and, for exterior tiles, the building structure elements include exterior walls and other elements that correspond to the exterior of a building that is visible from the street in the three-dimensional virtual environment for sides with type "0". The type code "0000" is used for a building segment that corresponds to a complete building for use in smaller regions where a smaller region being covered by a single tile is surrounded by the streets in the three-dimensional virtual environment.

Figure 6:
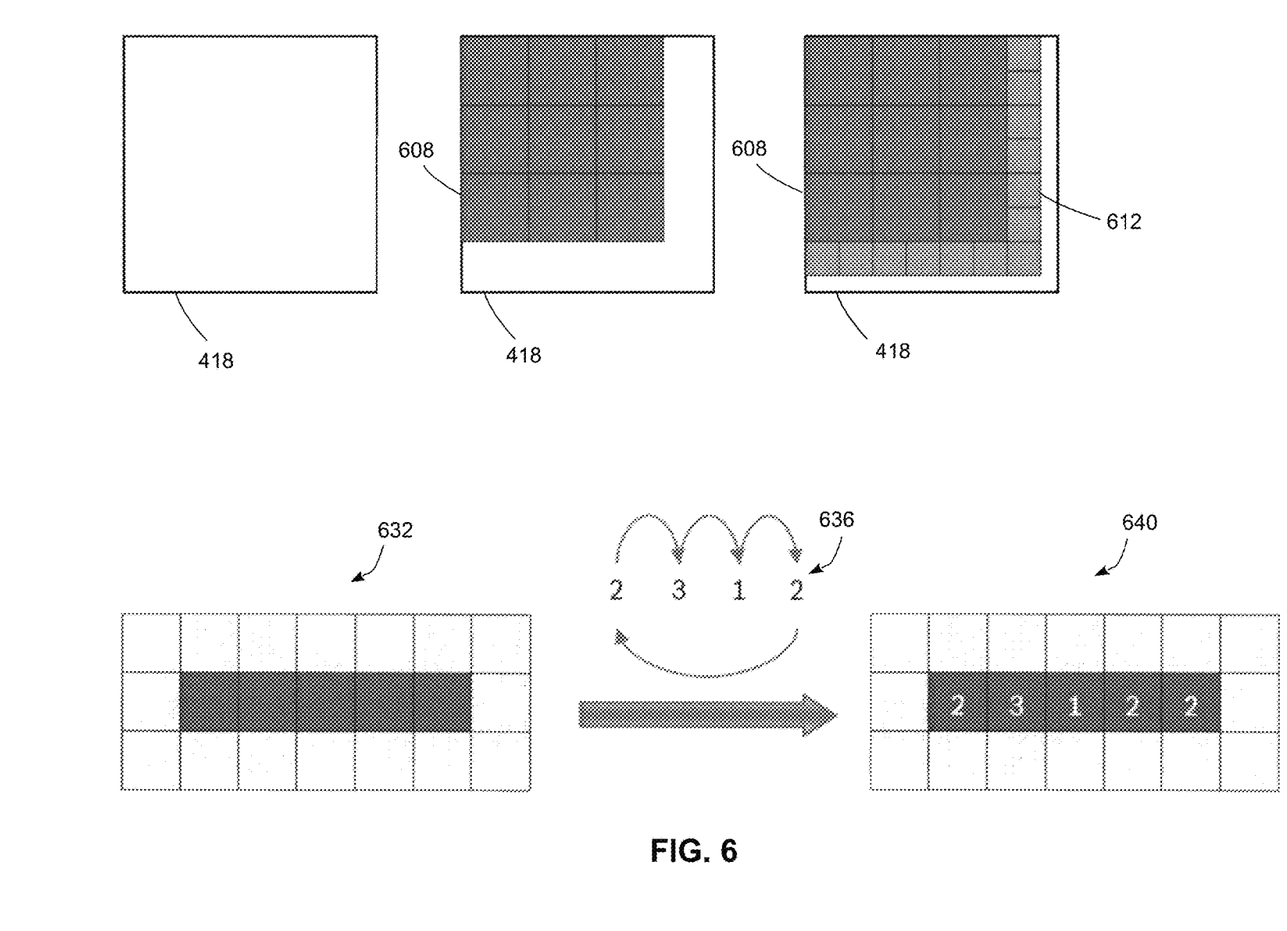
FIG. 6 is a diagram depicting two-dimensional arrangements of different tile sizes to fill a rectangle in a region of the 3D virtual environment that includes the procedurally generated buildings and a set of pseudo-random index data that the system of FIG. 1 uses to select different sets of building segment graphics for different tiles.

As depicted in FIG. 6, during the process 200 the processor 108 fills the rectangular region 418 with tiles from one or more tile groups to generate the two-dimensional arrangement of tiles. In the example of FIG. 6, the processor 108 partially fills the region 418 with the larger tiles 608 and subsequently fills in a portion of the remaining area within the region 418 with the smaller tiles 612. In some instances, such as in FIG. 6, a small portion of the rectangle remains uncovered by any tiles, and in some embodiments the system 100 uses a predetermined ground texture or other graphical effect to simulate grass, sidewalks, or other terrain features that are commonly found around the borders of buildings.

The process 200 continues as the processor 108 optionally selects a set of building segment graphics based on a geographic location of the displayed regions corresponding to the physical world and optionally with reference to time of day and weather data (block 216). For example, in a navigational application the processor 108 identifies location coordinate data in the 3D virtual environment data 124 that corresponds to a geographic region on Earth. The processor 108 selects one set of building segment graphics from the building graphics data 128 in the memory 120 that corresponds to an architectural style for buildings within a predetermined geographic region. For example, if the 3D virtual environment displays an urban environment in a city in Germany, then the processor 108 retrieves a set of building segments 128 from the memory 120 that correspond to European or German architecture to provide a more realistic set of procedurally generated graphics. In some embodiments, the building segment data 128 stores sets of building segment data for architectural styles in different geographic regions that the system 100 displays during operation. In one embodiment where the system 100 is incorporated with a vehicle navigation system, the system 100 receives updated sets of building segment data via the network device 152 as the vehicle travels through different geographic regions to enable the memory 120 to store sets of building segment data that correspond to building architectures that are typically found in the geographic regions through which the vehicle travels.

The process 200 continues as the processor 108 selects one building segment in a subset of the plurality of building segment data 128 in the memory 120 for each tile in the region based on the pseudo-random index data 136 to select one building segment from the building segment data 128 (block 220). In the system 100, the memory 120 stores a plurality of pseudo-random tile index arrays 136 that map a single tile type code to multiple building segment graphics that are stored in the selected set of building graphics for a particular region. The processor 108 uses a hash function or other mapping to select one of the pseudo-random index arrays 136 from the memory 120 based on, for example, the coordinates of the region within the 3D virtual environment or some other fixed value that is associated with the region. As noted above, each type code value for a given tile corresponds to a subset of different building segment graphics (e.g. one column of different building segment graphics in a two-dimensional table). The processor 108 uses the pseudo-random index value from the random building segment index data 136 to identify one set of building segment graphics from the selected subset (e.g. the type code and the index value act as column and row identifiers for the processor to select one set of building segment graphics in the two-dimensional table). Thus, the system 100 produces procedurally generated graphics for each region within the three-dimensional virtual environment that appear to be random to the user of the system 100 but the system 100 also regenerates the same set of procedurally generated graphics for the same region in a consistent manner during operation of the system 100.

Using FIG. 6 as an example, the tiles 632 represent a portion of the rectangle within a region of the three-dimensional virtual environment that receives procedurally generated buildings. The processor 108 selects a set of pseudo-random index sequences 636 that correspond to different sets of building segment graphics for each of the tiles that are selected from a suitable set of building segments based on the type codes of each tile. In one embodiment, each of the tiles 632 and 640 is considered to have a single type code (e.g. 1111) in a map region with grids of streets that surround each tile, but the system 100 selects different sets of building graphics for the tiles that each have the same type code in a pseudo-random manner. In the example of FIG. 6, a subset of the building segment graphics data 128 includes three different individual building segment graphics models, which are indexed 1-3, for the corresponding type code of each tile, which is 1111 for reach tile in the example of FIG. 6. The processor 108 selects individual sets of building segment graphics in the tiles 640 based on the tile type codes and the pseudo-random sequence 636. If the number of tiles exceeds the length of the pseudo-random sequence, then the processor 108 returns to the start of the sequence to select the building segment graphics that are associated with each tile type and graphics index number. For example, in FIG. 6 the four-digit pseudo-random sequence 636 includes index values 2, 3, 1, 2 for different building segment graphics. In the tiles 640, the processor 108 assigns four tiles the values 2, 3, 1, 2 and returns to the first value (2) in the pseudo-random sequence for the fifth tile. The processor 108 uses the geographic coordinates of the region to identify the same pseudo-random sequence for the tiles in the region to enable the system 100 to present a consistent set of procedurally generated building graphics within the region during operation of the system 100.

The process 200 continues as the processor 108 generates a graphical depiction of the 3D virtual environment including the procedurally generated buildings within the region of the three-dimensional virtual environment that is enclosed by the streets (block 224). In the system 100, the CPU 112 and GPU 116 generate the graphical depiction of the 3D virtual environment based on the 3D virtual environment and street network data 124. The processor 108 also generates the graphics for the selected building segment data 128 in the tile locations for each of the regions that are enclosed by the street network using the building segment data for each tile type and pseudo-random index in the set of building segment graphics. The system 100 generates the graphics including the procedurally generated buildings for each of the identified regions that the processor 108 renders for graphical output via the display device 144.

Figure 7:
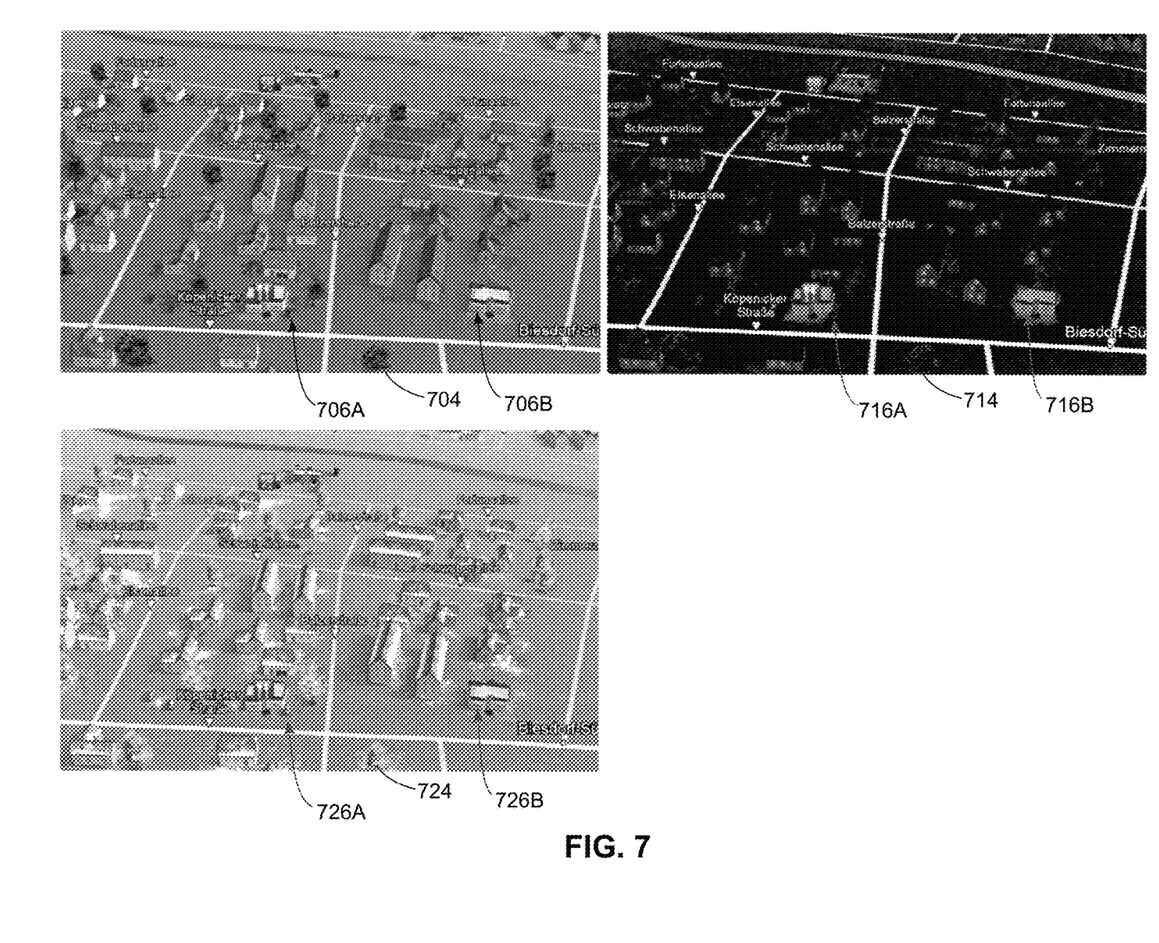
FIG. 7 is a set of graphical depictions of a 3D virtual environment with different regions that include different sets of procedurally generated buildings during day, night, and snow environmental conditions.
Figure 8:
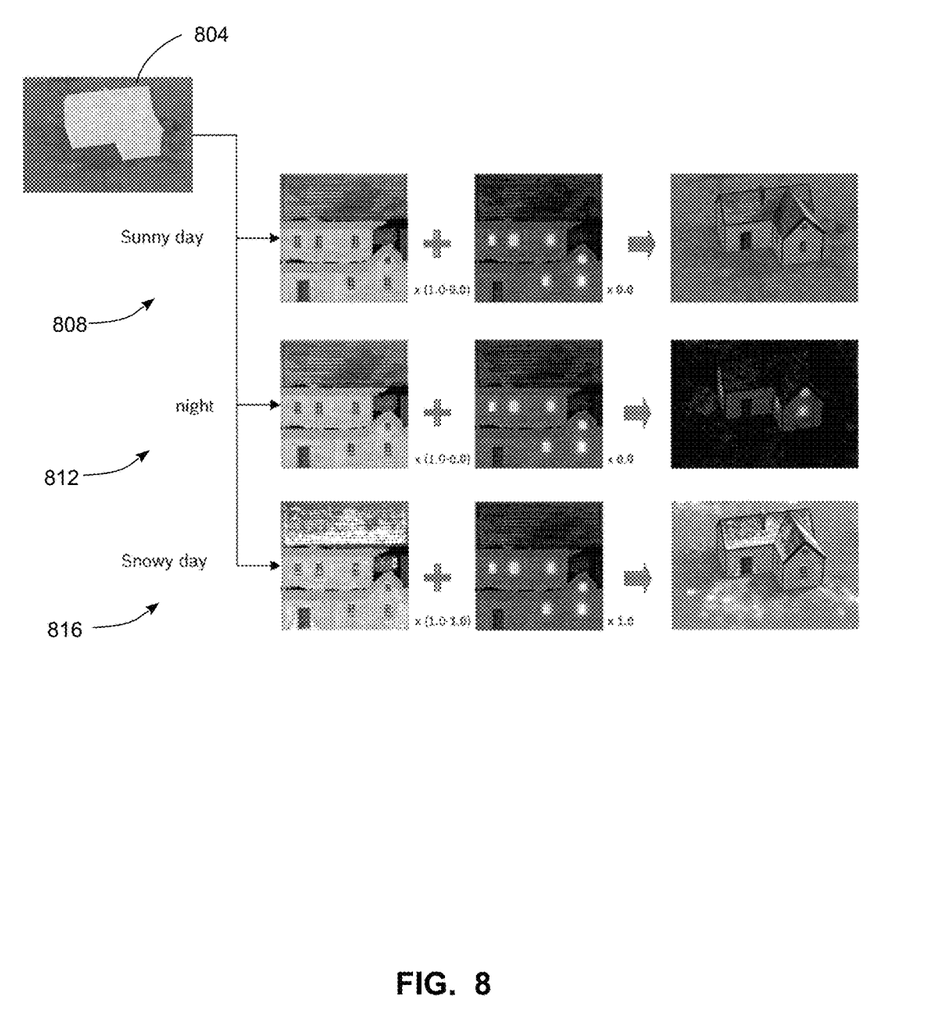
FIG. 8 is a set of illustrative depictions of a building segment with different graphical effects applied to the building segment based on time of day and season in the 3D virtual environment.

FIG. 7 and FIG. 8 include illustrative graphical depictions of the procedurally generated buildings within the 3D virtual environment. FIG. 7 includes four graphical depictions 704, 714, 724, and 734 of the 3D virtual environment during different time and weather conditions, such as daytime (704), night time (714), during snowing conditions in winter (724). In the processor 108, the clock 118 provides time information that enables generation of graphics in the three-dimensional virtual environment corresponding to the time of day and the time of year in the physical environment that is external to the system 100. As depicted in the view 704, the two regions 706A and 706B are both enclosed by streets within the 3D virtual environment. The system 100 performs the procedural generation process 200 for the buildings within each of the regions 706A and 706B to generate sets of buildings that are different for both of the regions 706A and 706B. As describe above, the pseudo-random process for building segment generation enables the system 100 to reproduce the same sets of buildings for each region at different times of operation of the system 100. Thus, in the display 714, the regions 716A and 716B include the same buildings that are depicted in the display 704, but the system 100 applies lighting effects or changes appearance textures to depict the buildings at night instead of during the day. Similarly, the regions 726A and 726B of the display 724 include the same building segments in the displays 704 and 714 but with additional graphical effects to depict the procedurally generated buildings during the winter.

FIG. 8 illustrates of different graphical effects that the GPU 118 can apply to a single building segment 804 using, for example, programmable shaders to implement graphical effects and apply one or more textures to the building graphical model to modify the visual depiction of a single building within the region of the 3D virtual environment. For example, in one embodiment the processor 118 identifies a color parameter for a fragment shader to apply textures to the building segment that accommodate different lighting conditions based on the following formula: $f(color) = T_{day} \times (1.0 - \alpha) + T_{night} \times \alpha$ where $T_{day}$ is a first texture used for the exterior of the building segment 804 during the day, $T_{night}$ is a second texture used at night, and $\alpha$ is a parameter that varies from full daylight ($\alpha = 0.0$) to full darkness ($\alpha = 1.0$) based on the time of day and other lighting condition data in the 3D virtual environment. In the system 100, the processor 100 uses the clock 118 to identify the time of day and optionally the time of year corresponding to different seasons. FIG. 8 depicts the same building model 804 depicted on a sunny day (804), at night (812), and on a snowy day (816) for different values of $\alpha$ and using different sets of textures for the building 804. In some embodiments, the processor 108 also receives weather condition data from an external weather service via the network device 152 to enable the system 100 to apply graphical effects to different regions based on the current weather conditions in each region.

As mentioned above, the system 100 identifies regions within the three-dimensional virtual environment that receive procedurally generated building graphics based on the layout of a street network within the three-dimensional virtual environment. FIG. 3 depicts a process 300 for identification of the regions within the street network using the system 100. In the discussion below, a reference to the process 300 performing a function or action refers to an operation of a processor to execute stored program instructions to perform the function or action in association with other components in a graphics display system. The process 300 is described in conjunction with the system 100 of FIG. 1 and the depictions of FIG. 4 for illustrative purposes.

The process 300 begins as the processor 108 identifies intersections in the street network from the 3D virtual environment data 124 (block 304). As described above, the 3D virtual environment data includes sets of data that identify streets including the sizes and shapes of streets in the 3D virtual environment and intersections between streets. These data are commonly used in navigation applications to route a person or vehicle to a destination. The processor 108 subsequently generates directed graphs between the intersections (block 308). In one embodiment that is depicted in FIG. 4, the processor 108 generates directed graphs with "half edges", which is to say that each edge in the graph that connects two intersections further includes two half edges that each point in opposite directions. For example, in FIG. 4 the directed graph 408 includes intersections 450 and 454 that are connected by half edges 458 and 462. The half edge 458 is a first directed edge from intersection 454 to 450 and the half edge 462 is a second half edge from intersection 450 to intersection 454. During process 300 the system 100 generates two half edges between connected intersections because a single segment of the street often forms a border for two different regions in the 3D virtual environment on either side of the street. As set forth below, each half edge becomes a portion of the border for one of the two regions.

Process 300 continues as the processor 108 traverses the half edges in the directed graph to identify loops within the street network that surround regions within the 3D virtual environment that receive the procedurally generated buildings. The processor 108 selects a first half edge in the directed graph and marks the half edge as being visited (block 312). In the system 100, the processor 108 optionally associates a Boolean value or other suitable data value with each half edge to indicate if the half edge has been "visited" or processed by the processor 108 during the graph traversal process. During the process 300, the processor 108 uses the currently visited half edge in the graph to select the next half edge from the intersection at the end of the previously selected half edge based on the direction of half edges that extend from the intersection (block 316). For example, in the graph 408 of FIG. 4, the processor 108 visits the half edge 458 and identifies the next half edge 466 based on the angle of the next half-edge based on the angle that most closely approximates a counter-clockwise direction turn from the intersection. As depicted visually in FIG. 4, the processor 108 attempts a left hand (counter-clockwise) turns to select the next half edge at each intersection to visit all of the half edges in the graph.

Process 300 continues iteratively as the processor 108 identifies if the new current edge has already been visited (block 320). If the half edge has not previously been visited, then the processor 108 marks the current half edge as being visited (block 328) and the process 300 returns to the processing described above with reference to block 316 to select the next half edge. If the processor 108 selects the next half edge that has already been visited (block 320) then the processor 108 identifies all of the previously visited half edges that were visited from either the first half edge or the half edges visited after the previously identified region in the 3D virtual environment as surrounding one region in the 3D virtual environment that includes the procedurally generated buildings, and the processor 108 generates a polygon around the region corresponding to the shapes of the roads that form the half edges around the region (block 324). For example, in FIG. 4, the processor 108 identifies the half edges 458, 466, 470, and 474 that form a loop around the region 406. The processor 108 visits the half edges as described above until returning to the previously visited half edge 458, and the half edge 458 along with all of the half edges that were visited after the initial visit to the half edge 458 form a loop that encloses the region 406. As depicted in the drawing 412, the processor 108 generates the bounding polygon 416 based on the sizes and shapes of the streets that correspond to the half edges 458, 466, 470, and 474. While the half edges are depicted as straight lines for illustrative purposes, the bounding polygon may have segments that approximate curves and other features in streets if the streets are not formed in straight lines.

The process 300 continues as the processor 108 visits additional half edges in the directed graph (block 332) with additional iterations of the processing described above with reference to blocks 316-328 to visit the remaining half edges in the directed graph and identify any additional regions of the 3D virtual environment that are enclosed by the streets. After all of the half edges in the graph have been visited, the system 100 uses the polygons that are generated around all of the identified regions to form the procedurally generated buildings as is described above in the process 200 (block 336). After completion of the process 300, the system 100 optionally stores the bounding polygons for each region along with identification data, such as coordinates for the location of each region, with the 3D virtual environment data 124 in the memory 120. Consequently, the system 100 can perform the process 300 relatively infrequently and have the cached region data available for the process 200 without having to perform the process 300 each time the system 100 performs the process 200. The system 100 then performs the process 300 only for newly encountered street networks either when the street network data are updated to reflect new street layouts or if a vehicle or mobile electronic device enters a new geographic region with a different street network.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for generating graphics corresponding to a plurality of buildings in a three-dimensional virtual environment comprising:
    identifying, with a processor, a region in the three-dimensional virtual environment that is enclosed by a plurality of streets within the three-dimensional virtual environment;
    identifying, with the processor, a rectangular portion of the region in the three-dimensional virtual environment;
    generating, with the processor, a two-dimensional arrangement of a plurality of tiles only within the rectangular portion of the region, each tile corresponding to a subset of building segment graphics in a plurality of building segment graphics stored in a memory;
    identifying, with the processor, one building segment graphic in the subset of building segment graphics for each tile in the plurality of tiles based on an array of pseudo-random index values stored in the memory, each index value corresponding to one building segment graphic in the subset of building segment graphics; and
    generating, with the processor and a display device, a graphical depiction of the three-dimensional virtual environment including a graphical depiction of the plurality of buildings in the region based on the two-dimensional arrangement of the plurality of tiles and the one building segment graphic identified for each tile in the plurality of tiles.

2. The method of claim 1, the generating of the two-dimensional arrangement of the plurality of tiles further comprising: generating, with the processor, the two-dimensional arrangement within the rectangular portion of the region including a first plurality of tiles having a first size, and a second plurality of tiles having a second size, the first size being greater than the second size, and the second plurality of tiles being formed in a margin of the rectangular portion of the region that cannot include an additional tile of the first size.

3. The method of claim 1 further comprising:
    identifying, with the processor, coordinates of the region within the 3D virtual environment; and
    retrieving, with the processor, the array of pseudo-random index values from a plurality of arrays of pseudo-random index values from the memory based on the coordinates.

4. The method of claim 1, the generating of the two-dimensional arrangement of the plurality of tiles within the region further comprising:
    assigning, with the processor, a type code to each tile in the plurality of tiles based on an arrangement of sides of each tile in the plurality of tiles that are adjacent to another tile in the two-dimensional arrangement of the plurality of tiles; and
    identifying, with the processor, the subset of building segment graphics corresponding to each tile based on the type code.

5. The method of claim 1, the identifying of the region in the three-dimensional virtual environment further comprising:
    identifying, with the processor, a plurality of streets and a plurality of intersections between the plurality of streets in the three-dimensional virtual environment based on three-dimensional virtual environment data stored in the memory;
    generating, with the processor, a directed graph including two half edges formed each pair of intersections in the plurality of intersections that are connected by streets in the plurality of streets; and
    identifying the region in the three-dimensional virtual environment based on a loop in a portion of the half edges in the directed graph that enclose the region.

6. The method of claim 5 further comprising:
    generating, with the processor, a bounding polygon around the region based on the plurality of streets in the three-dimensional virtual environment that correspond to the half edges in the directed graph that enclose the polygon; and
    generating, with the processor, the two-dimensional arrangement of a plurality of tiles within the bounding polygon.

7. A graphics display system comprising:
    a display device;
    a memory configured to store data corresponding to: a three-dimensional virtual environment including a plurality of streets; and a plurality of building segment graphics for buildings in the three-dimensional virtual environment; and a processor operatively connected to the memory and the display device, the processor being configured to:

identify a region in the three-dimensional virtual environment that is enclosed by the plurality of streets within the three-dimensional virtual environment;

identify a rectangular portion of the region in the three-dimensional virtual environment;

generate a two-dimensional arrangement of a plurality of tiles only within the rectangular portion of the region, each tile corresponding to a subset of building segment graphics in the plurality of building segment graphics;

identify one building segment graphic in the subset of building segment graphics for each tile in the plurality of tiles based on an array of pseudo-random index values stored in the memory, each index value corresponding to one building segment graphic in the subset of building segment graphics; and generate a graphical depiction of the three-dimensional virtual environment with the display device, the graphical depiction including a plurality of buildings in the region based on the two-dimensional arrangement of the plurality of tiles and the one building segment graphic identified for each tile in the plurality of tiles.

8. The system of claim 7, the processor being further configured to: generate the two-dimensional arrangement within the rectangular portion of the region including a first plurality of tiles having a first size, and a second plurality of tiles having a second size, the first size being greater than the second size, and the second plurality of tiles being formed in a margin of the rectangular portion of the region that cannot include an additional tile of the first size.

9. The system of claim 7, the processor being further configured to:

identify coordinates of the region within the 3D virtual environment; and retrieve, the array of pseudo-random index values from a plurality of arrays of pseudo-random index values from the memory based on the coordinates.

10. The system of claim 7, the processor being further configured to:

assign a type code to each tile in the plurality of tiles based on an arrangement of sides of each tile in the plurality of tiles that are adjacent to another tile in the two-dimensional arrangement of the plurality of tiles; and identify the subset of building segment graphics corresponding to each tile based on the type code.

11. The system of claim 7, the processor being further configured to:

identify a plurality of streets and a plurality of intersections between the plurality of streets in the three-dimensional virtual environment based on three-dimensional virtual environment data stored in the memory;

generate a directed graph including two half edges formed each pair of intersections in the plurality of intersections that are connected by streets in the plurality of streets; and identify the region in the three-dimensional virtual environment based on a loop in a portion of the half edges in the directed graph that enclose the region.

12. The system of claim 11, the processor being further configured to:

generate a bounding polygon around the region based on the plurality of streets in the three-dimensional virtual environment that correspond to the half edges in the directed graph that enclose the polygon; and generate the two-dimensional arrangement of a plurality of tiles within the bounding polygon.

* * * * *